(12) United States Patent
Liu et al.

(10) Patent No.: US 6,759,780 B2
(45) Date of Patent: Jul. 6, 2004

(54) FRACTIONAL-SLOT WINDING MOTOR

(75) Inventors: Buyun Liu, Ann Arbor, MI (US); Tomy Sebastian, Saginaw, MI (US); Sunil Keshava Murthy, Austin, TX (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/850,758

(22) Filed: May 8, 2001

(65) Prior Publication Data
US 2002/0167242 A1 Nov. 14, 2002

(51) Int. Cl.[7] .................................................. H02K 1/00
(52) U.S. Cl. ........................ 310/184; 310/179; 310/180; 29/596
(58) Field of Search ................................ 310/184, 180, 310/179; 29/596

(56) References Cited

U.S. PATENT DOCUMENTS

| | | | |
|---|---|---|---|
| 3,854,077 A | * 12/1974 | Greenwell | .................. 318/808 |
| 4,348,606 A | 9/1982 | Hibino | |
| 4,409,507 A | 10/1983 | Godwin | |
| 4,751,416 A | 6/1988 | Torok | |
| 4,868,438 A | * 9/1989 | Okamoto et al. | ........... 310/166 |
| 4,896,063 A | * 1/1990 | Roberts | .................... 310/68 R |
| 5,723,930 A | * 3/1998 | Ho et al. | ..................... 310/179 |
| 5,821,660 A | * 10/1998 | Anderson | .................... 310/184 |
| 5,982,067 A | * 11/1999 | Sebastian et al. | ........... 310/184 |
| 6,008,561 A | * 12/1999 | Tang | .......................... 310/183 |
| 6,351,050 B1 | * 2/2002 | Coles | .................... 310/156.53 |
| 6,359,349 B1 | * 3/2002 | Sakamoto | ................. 310/49 R |
| 6,376,957 B1 | * 4/2002 | Haydock et al. | ............ 310/155 |
| 6,459,189 B1 | * 10/2002 | Lloyd | ......................... 310/261 |

OTHER PUBLICATIONS

Anma et al, Permanent Magnet Type Three–Phase AC Rotary Electric Machine, Sep. 2002, U.S. Patent Application Publication.*

Braymer, D., Armature Winding and Motor Repair, 1920, McGraw–Hill, First Edition, pp. 7–8.*

* cited by examiner

Primary Examiner—Tran Nguyen
Assistant Examiner—J. Aguirrechea
(74) Attorney, Agent, or Firm—Michael D. Smith

(57) ABSTRACT

A brushless electric motor is disclosed. In an exemplary embodiment of the invention, the motor includes a permanent magnet rotor having a plurality of magnetic poles thereupon and a stator. The stator further includes a plurality of stacked laminations defining a plurality of slots therein, and a plurality of fractional-pitch phase windings disposed within the plurality of slots. The motor has a non-integer slots-per-pole ratio, and a magnitude of $5^{th}$ and $7^{th}$ harmonic components of a fundamental frequency component of the motor are less than 0.3% and 0.1% of a magnitude of the fundamental frequency component, respectively.

20 Claims, 2 Drawing Sheets

FRACTIONAL-SLOT WINDING MOTOR

BACKGROUND OF THE INVENTION

Polyphase permanent magnet, brushless motors driven by a sinusoidal current offer the capability of providing low torque ripple, noise and vibration in comparison with those driven by a square wave current. Theoretically, if a motor controller can produce polyphase sinusoidal currents with the same frequency as that of the sinusoidal back EMFs, the torque output of the motor will be a constant, and zero torque ripple can be achieved. However, due to practical limitations of motor design and controller implementation, there are deviations from pure sinusoidal back EMF and current waveforms. The deviations will typically result in parasitic torque ripple components at various frequencies and magnitudes.

Another component of torque ripple in a conventional permanent magnet, brushless motor is cogging torque. Cogging torque is a result of the magnetic interaction between the permanent magnets of the rotor and the slotted structure of the armature. As the leading edge of a magnet approaches an individual stator tooth, a positive torque is produced by the magnetic attraction force exerted therebetween. However, as the magnet leading edge passes and the trailing edge approaches, a negative torque is produced. The instantaneous value of the cogging torque varies with rotor position and alternates at a frequency that is proportional to the motor speed and the number of slots. The amplitude of the cogging torque is affected by certain design parameters such as slot opening/slot pitch ratio, magnet strength and air gap length.

One approach to reduce cogging torque is to skew either the stator teeth or the rotor magnet longitudinally, which provides for a gradual transition as the magnet moves under a stator tooth. However, due to practical factors such as magnetic leakage end effects, as well as skew variation in manufacturing tolerances, some undesirable cogging remains. An alternative approach is to employ a slotless armature, which allows for precise winding patterns in order to achieve a pure sinusoidal back EMF. In addition, the absence of slots in the armature eliminates the cogging torque resulting therefrom. However, the manufacturing process for slotless motors is not well defined and thus the manufacturing costs thereof may be prohibitive.

SUMMARY OF THE INVENTION

The problems and disadvantages of the prior art are overcome and alleviated by a brushless electric motor. In an exemplary embodiment of the invention, the motor includes a permanent magnet rotor having a plurality of magnetic poles thereupon and a stator. The stator further includes a plurality of stacked laminations defining a plurality of slots therein, and a plurality of fractional-pitch phase windings disposed within the plurality of slots. The motor has a non-integer slots-per-pole ratio, and a magnitude of $5^{th}$ and $7^{th}$ harmonic components of a fundamental frequency component of the motor are less than 0.3% and 0.1% of a magnitude of the fundamental frequency component, respectively. In a preferred embodiment, the stator is wound with three separate phase windings. Each of the three separate phase windings further includes three parallel branches, with each parallel branch having a plurality of serially connected coil segments.

In an alternative embodiment, each of the phase windings are wound in the stator according to the following pattern:

traveling inward, through a beginning slot, then;
traveling outward, through a second slot which is four slots counterclockwise from the beginning slot, then;
traveling inward, through the beginning slot, then;
traveling outward, through a third slot which is four slots clockwise from the beginning slot, then;
traveling inward, through a fourth slot which is one slot clockwise from the beginning slot; then
traveling outward, through a fifth slot which is five slots clockwise from the beginning slot.

BRIEF DESCRIPTION OF THE DRAWINGS

The present invention will now be described, by way of example only, with reference to the accompanying drawings which are meant to be exemplary, not limiting, and wherein like elements are numbered alike in several Figures, in which.

DESCRIPTION OF THE PREFERRED EMBODIMENT

Figure 1:
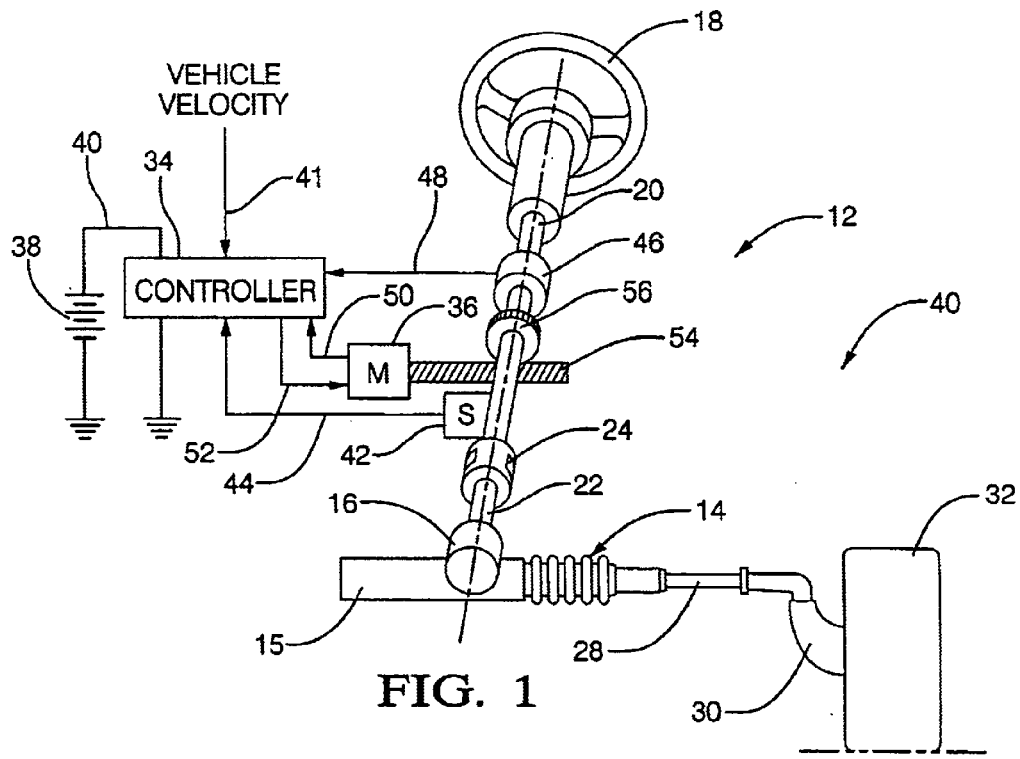
FIG. 1 is a schematic diagram of an electric power steering system using a three phase brushless motor in accordance with an embodiment of the invention.

Referring initially to FIG. 1, a motor vehicle 10 is provided with an electric power steering system 12. Electric power steering system 12 may include a conventional rack and pinion steering mechanism 14 having a toothed rack 15 and a pinion gear (not shown) under a gear housing 16. As steering wheel 18 is turned, an upper steering shaft 20 turns a lower shaft 22 through a universal joint 24. Lower steering shaft 22 turns the pinion gear. The rotation of the pinion gear moves the pinion rack 15, which then moves tie rods 28 (only one shown). In turn, tie rods 28 move steering knuckles 30 (only one shown) to turn wheels 32.

An electric power assist is provided through a controller 34 and a power assist actuator comprising a motor 36. Controller 34 receives electric power from a vehicle electric power source 38 through a line 40. The controller 34 also receives a signal representative of the vehicle velocity on line 41, as well as steering pinion gear angle from a rotational position sensor 42 on line 44. As steering wheel 18 is turned, a torque sensor 46 senses the torque applied to steering wheel 18 by the vehicle operator and provides an operator torque signal to controller 34 on line 48. In addition, as the rotor of motor 36 turns, rotor position signals for each phase are generated within motor 36 and provided over bus 50 to controller 34. In response to vehicle velocity, operator torque, steering pinion gear angle and rotor position signals received, the controller 34 derives desired motor phase currents. The motor phase currents are provided to motor 36 through a bus 52 to motor 36, which thereby provides torque assist to steering shaft 20 through worm 54 and worm gear 56.

Figure 2:
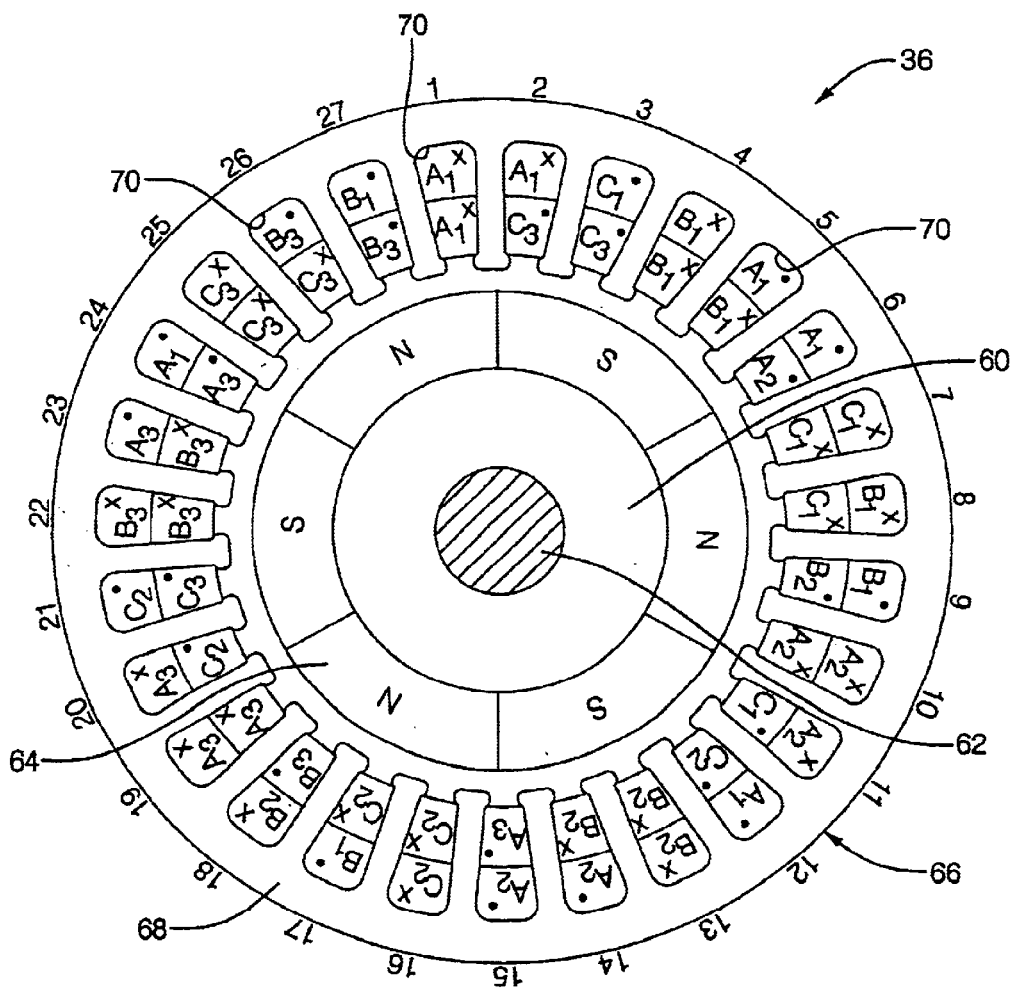
FIG. 2 is a cross-sectional view perpendicular to the axis of the three phase brushless motor shown schematically in FIG. 1.

Referring now to FIG. 2, brushless motor 36 in accordance with an embodiment of the invention has a six-pole, permanent magnet rotor 60, which is mounted on a shaft 62 and has six magnetic poles 64. A stator 66 features stacked laminations 68 defining twenty-seven slots 70. Each of the twenty-seven slots 70 are individually numbered in FIG. 2, beginning at slot 1 and proceeding clockwise to slot 27. Furthermore, each slot 70 houses two phase coils. As is described in further detail later, some slots will contain coils from the same phase, while other slots will have coils from two different phases. Because the number of slots/number of poles ratio is a non-integer, motor 36 is a fractional-slot winding motor. It will be appreciated by those skilled in the art that brushless motor 36, being a fractional-slot winding motor, may have a different number of poles (e.g., 4) or a different number of slots (e.g., 18) so long as the slots per pole ratio thereby is a non-integer.

Either the rotor poles 64 or the stator slots 70 may be skewed from the motor axis in a normal manner, such that the poles 64 and slots 70 are skewed by one slot pitch axially across the stator. It should be understood that, according to conventional industry practice, the skew may be slightly more or less (up to 5%) than one slot pitch to compensate for certain fringing effects. Any such variations in skew are intended to be included in the commonly understood meaning of the phrase "one slot pitch".

Figure 3:
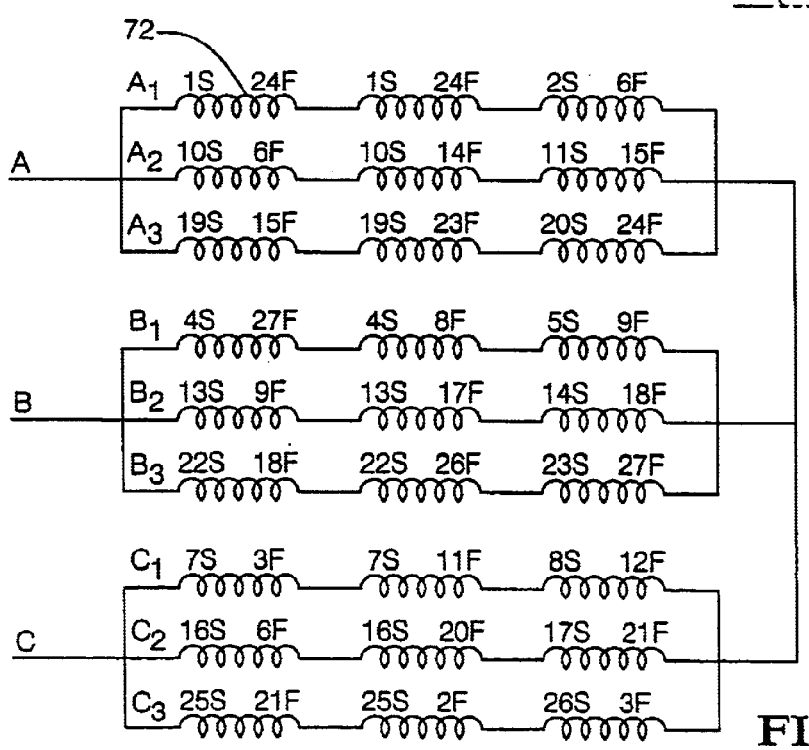
FIG. 3 illustrates the electrical connections of the phase windings and phase terminals in the motor of FIG. 2.

Referring to FIG. 3, each of the three phases has three parallel branches of windings. Each parallel winding branch, in turn, has three serially connected coil segments 72. For ease of understanding, each winding phase "A", "B" and "C" has three branches of windings designated as $A_1$, $A_2$ and $A_3$; $B_1$, $B_2$ and $B_3$; $C_1$, $C_2$ and $C_3$. The designations shown on each coil segment 72 represent the starting slot and the finishing slot for each segment. Specifically, the number in the designation represents the slot number and the letter (S or F) indicates whether the coil segment starts or finishes at that slot number. By way of example, winding branch $A_1$ of phase winding "A" has a first coil segment starting at slot 1 (1S) and ending at slot 24 (24F). A second coil segment is thereafter connected in series with the first coil segment, and starting again at slot 1 (1S) and ending at slot 5 (5F). Finally, a third coil segment is connected in series with the second coil segment. Third coil segment begins at slot 2 (2S) and ends at slot 6 (6F).

Upon close inspection of the winding diagram in FIG. 3, it will be seen that the winding branches of each of the motor phases are wound into an identical pattern. This pattern is also observed by reference to FIG. 2, which also illustrates the following winding pattern for each branch:

- traveling inward through a beginning slot;
- traveling outward through a second slot which is four slots counterclockwise from the beginning slot;
- traveling inward through the beginning slot;
- traveling outward through a third slot which is four slots clockwise from the beginning slot;
- traveling inward through a fourth slot which is one slot clockwise from the beginning slot; and
- traveling outward through a fifth slot which is five slots clockwise from the beginning slot.

In FIG. 2, a winding traveling in the inward direction is designated by superscript "x", and a winding traveling in the outward direction is designated by superscript "•". Thus, in the previous example, winding branch $A_1$ begins by traveling inward through slot 1. Accordingly, the designation $A_1^x$ is shown in the outer layer of slot 1. Following the above described pattern, winding $A_1$ then travels back outward in slot 24, which is four slots counterclockwise from slot 1. Thus, the designation $A_1^{\bullet}$ appears in the outer layer of slot 24. Continuing with the above winding pattern, the remaining segments of winding $A_1$ are represented by: $A_1^x$ in slot 1 (again), $A_1^{\bullet}$ in slot 5, $A_1^x$ in slot 2, and finally $A_1^{\bullet}$ in slot 6.

It will also be noted that the winding branches for a given phase are spaced apart from one another by 9 slots, or 120 mechanical degrees, while the winding branches of corresponding phases (e.g., $A_1$, $B_1$, $C_1$) are spaced apart by 3 slots, or 30 mechanical degrees. By using short pitch, distributed coils in winding a stator having fractional-pitch slot windings, it has been found that the magnitude of the $5^{th}$ & $7^{th}$ harmonic components are reduced to less than 0.3% and 0.1% of the fundamental frequency component, respectively.

An added benefit of the above described embodiments is the reduced thickness of the yoke needed for the motor, thereby resulting in a smaller volume. By increasing the number of rotor poles, less magnetic flux passes through the motor yoke than through an equivalent motor having fewer poles. Furthermore, having a reduced number of slots (than would normally be used in an integral slot winding machine) also reduces manufacturing costs while still providing sinusoidal back EMF.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A brushless electric motor, comprising:
   a permanent magnet rotor, said rotor having a plurality of magnetic poles thereupon; and
   a stator defining a plurality of slots therein; and
   a plurality of fractional-pitch phase windings disposed within said plurality of slots, a portion of said plurality of slots having phase windings of the same phase while another portion includes phase windings of different phases in each slot;
   wherein the motor has a non-integer slots-per-pole ratio, and
   a magnitude of $5^{th}$ and $7^{th}$ harmonic components of a fundamental frequency component of the motor are less than 0.3% and 0.1% of a magnitude of said fundamental frequency component, respectively.

2. The brushless motor of claim 1, wherein said stator is wound with three separate phase windings.

3. The brushless motor of claim 2, wherein each of said three separate phase windings further comprises:
   a plurality of parallel branches, with each parallel branch having a plurality of serially connected coil segments.

4. A brushless electric motor, comprising:
   a permanent magnet rotor, said rotor having a plurality of magnetic poles thereupon; and
   a stator defining a plurality of slots therein;
   a plurality of fractional-pitch phase windings disposed within said plurality of slots, a portion of said plurality of slots having phase windings of the same phase while another portion includes phase windings of different phases in each slot;
   wherein the motor has a non-integer slots-per-pole ratio,
   wherein each of said phase windings comprises three parallel branches, with each parallel branch having three serially connected coil segments.

5. The brushless electric motor of claim 4, said motor having 27 slots and 6 poles, each said plurality of fractional-pitch phase windings comprising three fractional-pitch phase windings.

6. The brushless electric motor of claim 5 wherein said three serially connected coil segments include a first coil passing through a reference slot in an inward direction and a second slot in an outward direction, the second slot being four slots counterclockwise from said reference slot, a second coil segment passing through said reference slot in said inward direction and through a third slot in said outward direction, said third slot being four slots clockwise from said reference slot; and a third coil segment passing through a fourth slot in said inward direction, said fourth slot being one slot clockwise from said reference slot, and through a fifth slot in said outward direction, said fifth slot being five slots clockwise from said reference slot.

7. The brushless electric motor of claim 6 wherein said three serially connected coil segments are serially connected in the order of first coil, then second coil, then third coil.

8. The brushless electric motor of claim 4, wherein a magnitude of $5^{th}$ and $7^{th}$ harmonic components of a fundamental frequency component of the motor are less than 0.3% and 0.1% of a magnitude of said fundamental frequency component, respectively.

9. The brushless electric motor of claim 4 wherein said stator comprises a plurality of stacked laminations.

10. A brushless electric motor, comprising:
a permanent magnet rotor, said rotor having a plurality of magnetic poles thereupon; and
a stator defining a plurality of slots therein;
a plurality of fractional-pitch phase windings disposed within said plurality of slots; and
wherein each of said phase windings comprise a first coil segment in which the winding travels inward through a reference slot and outward through a second slot which is four slots counterclockwise from said reference slot a second coil segment in which the winding travels inward through said reference slot and outward through a third slot which is four slots clockwise from said reference slot; and a third coil segment in which the winding travels inward through a fourth slot which is one slot clockwise from said reference slot and outward through a fifth slot which is five slots clockwise from said reference slot.

11. The brushless motor of claim 10, wherein said stator comprises 27 slots and said rotor comprises 6 poles.

12. The brushless electric motor of claim 10 wherein said first coil segment, said second coil segment, and said third coil segment are serially connected in the order of said first coil segment, then said second coil segment, then said third coil segment.

13. The brushless electric motor of claim 10 wherein said first coil, said second coil, and said third coil are serially connected and form one of three similar branches connected in parallel.

14. The brushless electric motor of claim 10 wherein the motor has a non-integer slots-per-pole ratio.

15. A method for winding a stator of a brushless motor having a permanent magnet rotor and a plurality of slots formed within the stator, the method comprising:
winding a first coil segment, a second coil segment, and a third coil segment of a phase winding such that;
said first coil segment passes through a reference slot in an inward direction and through a second slot in an outward direction, said second slot being four slots counterclockwise from said reference slot;
said second coil segment passes through said reference slot in said inward direction and through a third slot in said outward direction, said third slot being four slots clockwise from said reference slot; and
said third coil segment passes through a fourth slot in said inward direction, said fourth slot being one slot clockwise from said reference slot and through a fifth slot in said outward direction, said fifth slot being five slots clockwise from said reference slot.

16. The method of claim 15 wherein each said first coil, said second coil, and said third coil is wound in series and said first coil, said second coil, and said third coil are electrically connected in series.

17. The method of claim 16 wherein said first coil is wound first, said second coil is wound after said first coil is wound, and said third coil is wound after said second coil is wound.

18. The method of claim 15 wherein said first coil, said second coil, and said third coil comprise one branch of a plurality of similar branches of said phase winding, said method further comprising winding at least one additional branch of said plurality of similar branches in a manner similar to said one branch such that said plurality of similar branches are electrically connected in parallel and evenly spaced within said stator.

19. The method of claim 18 wherein said plurality of similar branches comprise three branches.

20. The method of claim 18 further comprising:
winding at least one additional phase winding such that each said additional phase winding has corresponding ones of said plurality of similar branches.

\* \* \* \* \*